United States Patent
Gao et al.

(10) Patent No.: US 12,395,900 B2
(45) Date of Patent: Aug. 19, 2025

(54) WIRELESS COMMUNICATION METHOD FOR MOBILITY HANDLING

(71) Applicant: ZTE Corporation, Guangdong (CN)

(72) Inventors: Yuan Gao, Guangdong (CN); He Huang, Guangdong (CN)

(73) Assignee: ZTE Corporation, Guangdong (CN)

( * ) Notice: Subject to any disclaimer, the term of this patent is extended or adjusted under 35 U.S.C. 154(b) by 378 days.

(21) Appl. No.: 17/744,043

(22) Filed: May 13, 2022

(65) Prior Publication Data

US 2022/0279394 A1 Sep. 1, 2022

Related U.S. Application Data

(63) Continuation of application No. PCT/CN2019/118174, filed on Nov. 13, 2019.

(51) Int. Cl.
*H04W 36/00* (2009.01)
*H04W 36/08* (2009.01)
*H04W 84/06* (2009.01)

(52) U.S. Cl.
CPC ... *H04W 36/0061* (2013.01); *H04W 36/0058* (2018.08); *H04W 36/08* (2013.01); *H04W 84/06* (2013.01)

(58) Field of Classification Search
CPC ......... H04W 36/0058; H04W 36/0061; H04W 36/08; H04W 84/06
See application file for complete search history.

(56) References Cited

U.S. PATENT DOCUMENTS

| 10,231,157 | B2 | 3/2019 | Jung et al. | |
|---|---|---|---|---|
| 2002/0013150 | A1* | 1/2002 | McKenna | H04L 45/00 455/430 |
| 2006/0030311 | A1* | 2/2006 | Cruz | H01Q 1/32 455/12.1 |
| 2010/0124934 | A1* | 5/2010 | Mach | H04W 24/02 455/456.1 |
| 2016/0187458 | A1* | 6/2016 | Shah | H04W 4/02 455/456.1 |
| 2019/0245614 | A1 | 8/2019 | Lucky et al. | |
| 2020/0178135 | A1* | 6/2020 | Yun | H04W 36/0061 |
| 2022/0110030 | A1* | 4/2022 | Ma | H04W 36/0061 |
| 2022/0132383 | A1* | 4/2022 | Shrestha | H04W 36/0061 |

(Continued)

FOREIGN PATENT DOCUMENTS

| CA | 3067371 A1 * | 4/2014 | ........... H04L 1/1812 |
|---|---|---|---|
| CN | 104756556 A | 7/2015 | |

(Continued)

OTHER PUBLICATIONS

Office Action for China Patent Application No. 201980102245.6 dated Apr. 3, 2024, with English translation (17 pages).

(Continued)

*Primary Examiner* — Fahmida S Chowdhury
(74) *Attorney, Agent, or Firm* — Crowell & Moring LLP

(57) ABSTRACT

Mobility handling with wireless communication for use in a wireless terminal may include receiving, from a wireless network node, cell reselection information, and prioritizing at least one first cell of a first network type for selecting a cell for a cell reselection procedure based on the cell reselection information.

18 Claims, 4 Drawing Sheets

(56) References Cited

U.S. PATENT DOCUMENTS

| | | | | |
|---|---|---|---|---|
| 2023/0247506 A1* | 8/2023 | Xu | ............... | H04B 7/0621 370/331 |
| 2023/0269635 A1* | 8/2023 | Xu | ............... | H04W 48/20 370/329 |
| 2023/0292210 A1* | 9/2023 | Choi | ............... | H04W 36/00698 |
| 2023/0319661 A1* | 10/2023 | Määttänen | ......... | H04W 36/0085 370/331 |
| 2024/0049092 A1* | 2/2024 | Määttänen | ......... | H04B 7/18541 |
| 2024/0064505 A1* | 2/2024 | Liang | ............... | H04W 8/24 |
| 2024/0163765 A1* | 5/2024 | Lee | ............... | H04W 36/08 |
| 2024/0205783 A1* | 6/2024 | Hong | ............... | H04W 36/362 |
| 2024/0244517 A1* | 7/2024 | Lee | ............... | H04W 48/20 |
| 2025/0081072 A1* | 3/2025 | Nuggehalli | ......... | H04B 7/1853 |

FOREIGN PATENT DOCUMENTS

| | | | | |
|---|---|---|---|---|
| CN | 109690973 A | | 4/2019 | |
| EP | 1379013 A1 * | | 1/2004 | ......... H04B 7/18506 |
| EP | 4 024 959 A1 | | 7/2022 | |
| GB | 2390265 A * | | 12/2003 | ......... H04B 7/18506 |
| WO | WO 2018/052744 A2 | | 3/2018 | |
| WO | WO 2019/016686 A1 | | 1/2019 | |
| WO | WO 2019/161044 A1 | | 8/2019 | |
| WO | WO-2019170866 A1 * | | 9/2019 | ......... H04B 7/18504 |
| WO | WO-2019201808 A1 * | | 10/2019 | ......... H04B 7/18502 |
| WO | WO-2019201810 A1 * | | 10/2019 | ......... H04B 7/18502 |
| WO | WO 2020/150999 A1 | | 7/2020 | |
| WO | WO 2021/080270 A1 | | 4/2021 | |
| WO | WO-2022038510 A1 * | | 2/2022 | ............ H04B 17/328 |
| WO | WO-2022038573 A1 * | | 2/2022 | ......... H04B 7/18513 |

OTHER PUBLICATIONS

CATT. Service continuity in NTN3GPP TSG-RAN WG2 Meeting #107, R2-1909909, Aug. 30, 2019 (Aug. 30, 2019) (3 pages).

Office Action for China Patent Application No. 201980102245.6 dated Sep. 28, 2023 (14 pages).

CATT. "Cell Selection and Reselection Issue between NTN and TN System" 3GPP TSG-RAN WG2 Meeting #107, R2-1908754, Aug. 16, 2019 (Aug. 16, 2019) (2 pages).

International Search Report and Written Opinion received for Application No. PCT/CN2019/118174 mailed Jul. 30, 2020 (12 pages).

LG Electronics Inc. "Report on email discussion [107#64][NTN] Cell Selection & reselection" 3GPP TSG-RAN WG2 Meeting #107bis, R2-1913953, Oct. 10, 2019 (22 pages).

CENC. "Consideration on LEO mobility in NTN", 3GPP TSG-RAN WG2 Meeting #107bis, R2-1913927, Oct. 4, 2019 (3 pages).

InterDigital Inc. "Report of Email Discussion [ 107#62] [NR/NTN] TP Mobility" 3GPP TSG-RAN WG2 meeting #107bis, R2-1913604, Oct. 8, 2019 (29 pages).

CATT. "Cell Selection and Reselection Issue between NTN and TN System" 3GPP TSG-RAN WG2 Meeting #107, R2-1908754, Aug. 16, 2019 (Aug. 16, 2019) (22 pages).

Extended European Search Report received for EP Application No. 19 95 2432.3 mailed Mar. 23, 2023 (11 pages).

LG Electronics Inc.: "Report on email discussion [107#64] [NTN] Cell Selection & reselection" 3GPP Draft; R2-1914070 Report of Email Discussion [107#64] [NTN] Cell Selection & Reselection, 3rd Generation Partnership Project (3GPP), Mobile Competence Centre; 650, Route Des Lucioles; F-06921 Soph, vol. RAN WG2, No. Chongqing, China; Oct. 14, 2019-Oct. 18, 2019, Oct. 18, 2019, XP051797900, Retrieved from the Internet: URL:https://ftp.3gpp.org/tsg_ran/WG2_RL2T_SGR2_107bis/Docs/R2-1914070.zip, R2-1914070 Report of email discussion [107#64] [NTN] Cell selection&reselection.doc (21 pp.).

"3rd Generation Partnership Project; Technical Specification Group Radio Access Network; NR; User Equipment (UE) procedures in Idle mode and RRC Inactive state (Release 15)", 3GPP Draft; 38304-F50, 3rd Generation Partnership Project (3GPP), Mobile Competence Centre; 650, Route Des Lucioles; F-06921 Sophia-Antipolis Cedex; France, Sep. 28, 2019, XP051799983, retrieved from the Internet: URL:https://ftp.3gpp.org/3guinternal/3GPP_ultimate_versions_to_be_transposed/sentToD_pc/38304-f50.zip, 38304-f50.docx (29 pp).

CATT: "Cell Selection and Reselection Issue between NTN and TN System", 3GPP Draft; R2-1908754, 3rd Generation Partnership Project (3GPP), Mobile Competence Centre ; 650, Route Des Lucioles; F-06921 Sophia-Antipolis Cedex; France, vol. ran WG2, No. Prague, Czech Republic; Aug. 26, 2019-Aug. 30, 2019, Aug. 16, 2019, XP051766576, Retrieved from the Internet: URL:http://www.3gpp.org/ftp/tsg_ran/WG2_RL_2/TSGR2_107/Docs/R21908754.zip (2 pp.).

Office Action for China Patent Application No. 201980102245.6 dated Oct. 31, 2024 (12 pp. with English translation).

Office Action for China Patent Application No. 201980102245.6 mailed Aug. 16, 2024 (9 pp.).

Office Action for Vietnam Patent Application No. 1-2022-03643 dated Aug. 30, 2024 (4 pp.).

Office Action for Korea Patent Application No. 10-2022-7019543 dated May 21, 2025 (5 pp.).

* cited by examiner

WIRELESS COMMUNICATION METHOD FOR MOBILITY HANDLING

PRIORITY

This application claims priority as a Continuation of PCT/CN2019/118174, filed on Nov. 13, 2019, entitled "A WIRELESS COMMUNICATION METHOD FOR MOBILITY HANDLING", published as WO 2021/092810 A1, the entirety of which is incorporated herein by reference.

TECHNICAL FIELD

This document is directed generally to wireless communications, and more particularly, to a wireless communication method for a mobility handling.

BACKGROUND

Nowadays, a user equipment (UE) may be served by not only a terrestrial network (TN) but also a non-terrestrial-network (NTN). In the NTN, a network coverage is provided by three different satellites:

Geostationary Earth orbit (GEO) satellites: Circular orbit at 35,786 km above the Earth's equator and following the direction of the Earth's rotation. An object in such an orbit has an orbital period equal to the Earth's rotational period and thus appears motionless, at a fixed position in the sky, to ground observers.

Low Earth Orbit (LEO) satellites: Orbit around the Earth with an altitude between 300 km, and 1500 km.

Medium Earth Orbit (MEO) satellites: region of space around the Earth above low Earth orbit and below geostationary Earth Orbit.

SUMMARY

This document relates to methods, systems, and devices for a mobility handling.

The present disclosure relates to a wireless communication method for use in a wireless terminal. The wireless communication method comprises:
receiving, from a wireless network node, cell reselection information; and
prioritizing at least one first cell of a first network type for selecting a cell for a cell reselection procedure based on the cell reselection information.

Various embodiments may implement the following features:

The first network type may be a network type of the wireless network node.

The first network type may be one of a non-terrestrial network, NTN, or a terrestrial network, TN.

The wireless communication method further comprises receiving, from the wireless network node, an indication of selecting one of the at least one first cell of the first network type as the selected cell of the cell reselection procedure.

The cell reselection information may be broadcasted in system information.

The cell reselection information may be in a radio resource control, RRC, signaling.

The cell reselection information may comprise a cell list of at least one NTN cell.

The first network type may be NTN and the selected cell may be one of the at least one NTN cell in the cell list.

The first network type may be TN and the selected cell is avoided to be one of the at least one NTN cell in the cell list.

At least one first frequency of the at least one first cell of the first network type may be prioritized for selecting the cell for the cell reselection procedure.

The at least one first frequency of the at least one first cell of the first network type may be prioritized by increasing a value of a frequency-level reselection priority associated with each of the at least one first frequency.

A range of the value of the frequency-level reselection priority may be extended.

The wireless communication method further comprises:
receiving, from the wireless network node, a priority offset, and
adjusting the value of the frequency-level reselection priority associated with each of the at least one first frequency by the priority offset.

The value of the frequency-level reselection priority may be associated with each of the at least one first frequency may be increased to be greater than a value of a frequency-level reselection priority associated with each of at least one second frequency of at least one second cell of a second network type, and the second network type may be different from the first network type.

The at least one first cell of the first network type may be prioritized by:
configuring a cell-level reselection priority associated with each of the at least one first cell of the first network type with a first value greater than a second value of a cell-level reselection priority associated with each of at least one third cell of a third network type, wherein the third network type is different from the first network type.

The wireless communication method further comprises receiving, from the wireless network node, an indication of whether a neighbor cell is one of the at least one first cell of the first network type.

The neighbor cell may be relevant for the cell reselection procedure.

The cell reselection procedure may be one of an intra NTN cell reselection procedure, a TN to NTN reselection procedure or an NTN to TN cell reselection procedure.

The wireless communication method further comprises receiving, from the wireless network node, an identifier list comprising at least one of a closed access group identifier of the at least one first cell or a network identifier of the at least one first cell.

The wireless terminal may prioritize the at least one first cell of the first network type based on the identifier list.

The wireless communication method further comprises receiving, from the wireless network node, a satellite type and/or a NTN type of at least one of at least one stand-alone non-public network, at least one closed access group, or at least one public mobile network.

The wireless communication method further comprises:
receiving, from the wireless network node, a synchronization signal/physical broadcast channel, SS/PBCH, block measurement timing configuration, SMTC, of a NTN cell, wherein the SMTC is applied when performing measurements on the NTN cell;
receiving, from the wireless network node, a window offset; and
adjusting the SMTC of the NTN cell based on the window offset and an SMTC of a TN cell and apply the adjusted SMTC when performing measurements on the NTN cell.

The present disclosure relates to a wireless communication method for use in a wireless network node. The wireless communication method comprises transmitting, to a wireless terminal, cell reselection information of prioritizing at least one first cell of a first network type for selecting a cell for a cell reselection procedure.

Various embodiments may implement the following features:

The first network type may be a network type of the wireless network node.

The first network type may be one of a non-terrestrial network, NTN, or a terrestrial network, TN.

The wireless communication method further comprises transmitting, to the wireless terminal, an indication of selecting one of the at least one first cell of the first network type as the selected cell of the cell reselection procedure.

The cell reselection information may be broadcasted in system information.

The cell reselection information may be in a radio resource control, RRC, signaling.

The cell reselection information comprises a cell list of at least one NTN cell.

The first network type may be NTN and the selected cell is one of the at least one NTN cell in the cell list.

The first network type may be TN and the selected cell is avoided to be one of the at least one NTN cell in the cell list.

At least one first frequency of the at least one first cell of the first network type may be prioritized for selecting the cell for the cell reselection procedure.

The at least one first frequency of the at least one first cell of the first network type may be prioritized by increasing a value of a frequency-level reselection priority for each of the at least one frequency.

A range of the value of the frequency-level reselection priority may be extended.

The wireless communication method further comprises transmitting, to the wireless terminal, a priority offset for adjusting the value of the frequency-level reselection priority for each of the at least one first frequency.

The value of the frequency-level reselection priority for each of the at least one first frequency may be increased to be greater than a value of a frequency-level reselection priority for each of at least one second frequency of at least one second cell of a second network type and the second network type may be different from the first network type.

The at least one first cell of the first network type may be prioritized by:
configuring a cell-level reselection priority associated with each of the at least one first cell of the first network type with a first value greater than a second value of a cell-level reselection priority associated with each of at least one third cell of a third network type, wherein the third network type may be different from the first network type.

The wireless communication method further comprises transmitting, to the wireless terminal, an indication of whether a neighbor cell may be one of the at least one first cell of the first network type.

The neighbor cell may be relevant for the cell reselection procedure.

The cell reselection procedure may be one of an intra NTN cell reselection procedure, a TN to NTN reselection procedure or an NTN to TN cell reselection procedure.

The wireless communication method further comprises transmitting, to the wireless terminal, an identifier list comprising at least one of a closed access group identifier of the at least one first cell or a network identifier of the at least one first cell.

The wireless communication method further comprises, transmitting, to the wireless terminal, a specified closed access group identifier of the wireless network node or a specified network identifier of the wireless network node.

The wireless communication method further comprises transmitting, to the wireless terminal, a satellite type and/or a NTN type of at least one of at least one stand-alone non-public network, at least one closed access group, or at least one public mobile network.

The wireless communication method further comprises transmitting, to the wireless terminal, a synchronization signal/physical broadcast channel, SS/PBCH, block measurement timing configuration, SMTC, of a NTN cell.

The wireless communication method further comprises transmitting, to the wireless terminal, a window offset for adjusting a synchronization signal/physical broadcast channel, SS/PBCH, block measurement timing configuration, SMTC, of a NTN cell based on the window offset and SMTC of a TN cell.

The present disclosure relates to a wireless communication method for use in a wireless terminal. The wireless communication method comprises:
receiving, from a wireless network node, a group identification configured for a handover procedure; and
transmitting, to the wireless network node, the group identification and at least one measurement result for the handover procedure.

Various embodiments may implement the following features:

The group identification may be transmitted to the wireless terminal in system information, or a radio resource control, RRC, signaling.

The group identification may be transmitted, to the wireless network node, in a measurement report.

The group identification may be determined based on at least one of a location or a service type of the wireless terminal.

The wireless communication method further comprises:
receiving, from the wireless network node, a handover command, and
performing the handover procedure based on the handover command.

The present disclosure relates to a wireless communication method for use in a wireless network node. The wireless communication method comprises:
transmitting, to a wireless terminal, a group identification for a handover procedure;
receiving, from the wireless terminal, the group identification and at least one measurement result for the handover procedure, and
transmitting, to at least one first wireless terminal of a wireless terminal group corresponding to the group identification, a first handover command for the handover procedure.

Various embodiments may implement the following features:

The group identification may be transmitted to the wireless terminal in system information, or a radio resource control, RRC, signaling.

The group identification may be transmitted, to the wireless network node, in a measurement report.

The group identification may be determined based on at least one of a location or a service type of the wireless terminal.

The at least one first wireless terminal comprises all of wireless terminals in the wireless terminal group.

The at least one first wireless terminal comprises a portion of wireless terminals in the wireless terminal group.

The wireless communication method further comprises:
transmitting, to at least one second terminal of the wireless terminal group, a second handover command for the handover procedure,
wherein the first handover command indicates a first cell, and
wherein the second handover command indicates a second cell different from the first cell.

The present disclosure relates to a wireless terminal. The wireless terminal comprises:
a communication unit, configured to receive, from a wireless network node, a cell reselection information, and
a processor, configured to prioritize at least one first cell of a first network type for selecting a cell for a cell reselection procedure based on the cell reselection information.

Various embodiments may implement the following feature:

The processor may be further configured to perform the aforementioned wireless communication method for the terminal.

The present disclosure relates to a wireless network node. The wireless network node comprises a communication unit, configured to transmit, to a wireless terminal, a cell reselection information of prioritizing at least one first cell of a first network type for selecting a cell for a cell reselection procedure.

Various embodiments may implement the following feature:

The wireless network node further comprises a processor configured to perform the aforementioned wireless communication method for the wireless network node.

The present disclosure relates to a wireless terminal. The wireless terminal comprises a communication unit, configured to:
receive, from a wireless network node, a group identification configured for a handover procedure, and
transmit, to the wireless network node, the group identification and at least one measurement result for the handover procedure.

Various embodiments may implement the following feature:

The wireless terminal further comprises a processor configured to perform the aforementioned wireless communication method for the terminal.

The present disclosure relates to a wireless network node. The wireless network node comprises a communication unit, configured to:
transmit, to a wireless terminal, a group identification for a handover procedure;
receive, from the wireless terminal, the group identification and at least one measurement result for the handover procedure, and
transmit, to at least one first wireless terminal of a wireless terminal group corresponding to the group identification, a first handover command for the handover procedure.

Various embodiments may implement the following feature:

The wireless network node further comprises a processor configured to perform the aforementioned wireless communication method for the wireless network node.

The present disclosure relates to a computer program product comprising a computer-readable program medium code stored thereupon, the code, when executed by a processor, causing the processor to implement the aforementioned wireless communication method.

The exemplary embodiments disclosed herein are directed to providing features that will become readily apparent by reference to the following description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

BRIEF DESCRIPTION OF DRAWINGS

The above and other aspects and their implementations are described in greater detail in the drawings, the descriptions, and the claims.

DETAILED DESCRIPTION

Figure 1:
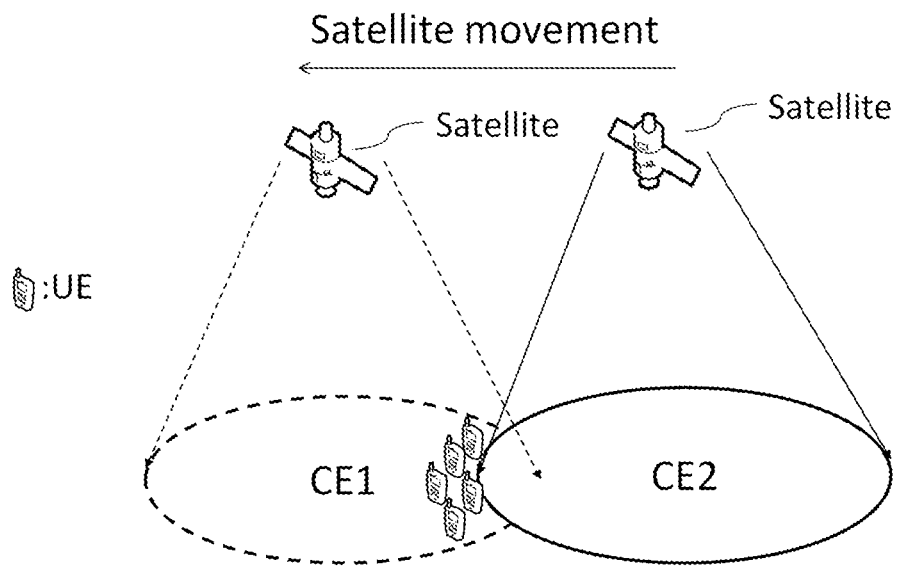
FIG. 1 shows a schematic diagram of a movement of a satellite.

The GEO satellites are static relative to the Earth while the LEO satellites and the MEO satellites move around the Earth. FIG. 1 shows a schematic diagram of a movement of a satellite. As shown in FIG. 1, the network coverage provided by the satellite may change from a cell CE2 to another cell CE1 because of the movement of the satellite. Due to the satellite movement, the network may further cover a huge number of UEs (e.g. the UEs located in the cell CE1 and on the edge of the cell CE2 as shown in FIG. 1). Under such a condition, the network may need to move the huge number of UEs from the cell CE2 to the cell CE1 because of the satellite movement. Because the UEs may be served by both the NTN and the TN, how to determine that the UEs should be moved to the cell of the NTN or the TN becomes an issue to be discussed.

In addition, since the number of the UEs required to be moved may be huge, it would be ineffective and resource consuming if the network triggers the huge number of UEs to move to the cell CE1 one by one.

Figure 2:
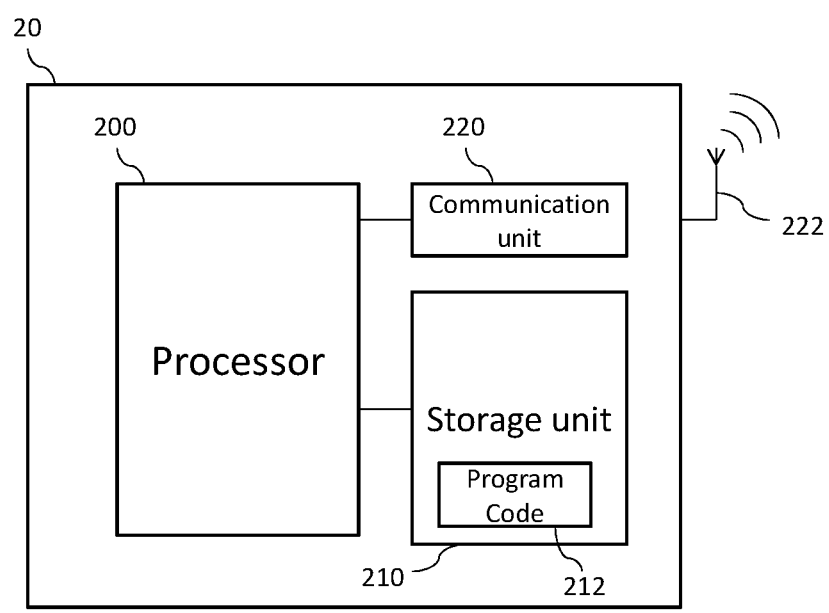
FIG. 2 shows an example of a schematic diagram of a network device according to an embodiment of the present disclosure.

FIG. 2 relates to a schematic diagram of a wireless terminal 20 according to an embodiment of the present disclosure. The wireless terminal 20 may be a user equipment (UE), a mobile phone, a laptop, a tablet computer, an electronic book or a portable computer system and is not limited herein. The wireless terminal 20 may include a processor 200 such as a microprocessor or Application Specific Integrated Circuit (ASIC), a storage unit 210 and a communication unit 220. The storage unit 210 may be any data storage device that stores a program code 212, which is accessed and executed by the processor 200. Embodiments of the storage unit 212 include but are not limited to a subscriber identity module (SIM), read-only memory (ROM), flash memory, random-access memory (RAM), hard-disk, and optical data storage device. The communication unit 220 may a transceiver and is used to transmit and receive signals (e.g. messages or packets) according to processing results of the processor 200. In an embodiment, the communication unit 220 transmits and receives the signals via at least one antenna 222 shown in FIG. 2.

In an embodiment, the storage unit 210 and the program code 212 may be omitted and the processor 200 may include a storage unit with stored program code.

The processor 200 may implement any one of the steps in exemplified embodiments on the wireless terminal 20, e.g., by executing the program code 212.

The communication unit 220 may be a transceiver. The communication unit 220 may as an alternative or in addition be combining a transmitting unit and a receiving unit configured to transmit and to receive, respectively, signals to and from a wireless network node (e.g. a base station).

Figure 3:
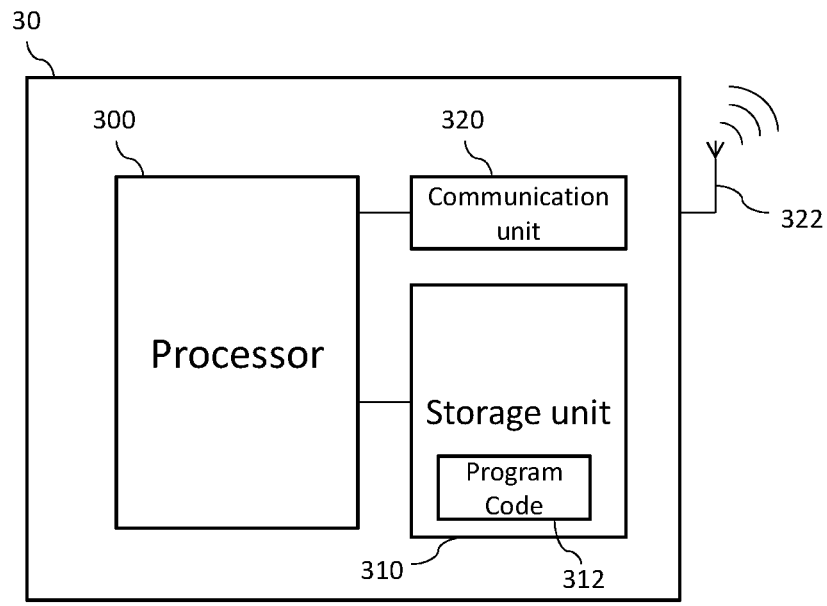
FIG. 3 shows an example of a schematic diagram of a network node according to an embodiment of the present disclosure.

FIG. 3 relates to a schematic diagram of a wireless network node 30 according to an embodiment of the present disclosure. The wireless network node 30 may be a satellite, a base station (BS), a network entity, a Mobility Management Entity (MME), Serving Gateway (S-GW), Packet Data Network (PDN) Gateway (P-GW), or Radio Network Controller (RNC), and is not limited herein. The wireless network node 30 may include a processor 300 such as a microprocessor or ASIC, a storage unit 310 and a communication unit 320. The storage unit 310 may be any data storage device that stores a program code 312, which is accessed and executed by the processor 300. Examples of the storage unit 312 include but are not limited to a SIM, ROM, flash memory, RAM, hard-disk, and optical data storage device. The communication unit 320 may be a transceiver and is used to transmit and receive signals (e.g. messages or packets) according to processing results of the processor 300. In an example, the communication unit 320 transmits and receives the signals via at least one antenna 322 shown in FIG. 3.

In an embodiment, the storage unit 310 and the program code 312 may be omitted. The processor 300 may include a storage unit with stored program code.

The processor 300 may implement any steps described in exemplified embodiments on the wireless network node 30, e.g., via executing the program code 312.

The communication unit 320 may be a transceiver. The communication unit 320 may as an alternative or in addition be combining a transmitting unit and a receiving unit configured to transmit and to receive, respectively, signals to and from a wireless terminal (e.g. a user equipment).

When operating in an idle radio resource control (RRC) state (i.e. RRC_IDLE) or an inactive RRC state (i.e. RRC_INACTIVE), a UE moves from one cell to another by performing a cell selection procedure and a cell reselection procedure. In this disclosure, the cell selection procedure may be equal to the cell reselection procedure. Furthermore, the cell selection may be equal to cell reselection in this disclosure.

Note that, the cell selection/reselection procedure of this disclosure may comprise an intra-NTN cell selection/reselection procedure, a TN to NTN cell selection/reselection procedure, and/or an NTN to TN cell selection/reselection procedure.

In addition, when operating in an RRC connected state (i.e. RRC_CONNECTED), the network (e.g. a wireless network node) moves a UE from one cell to another cell by providing a handover command to the UE, e.g., for performing a handover procedure.

Figure 4:
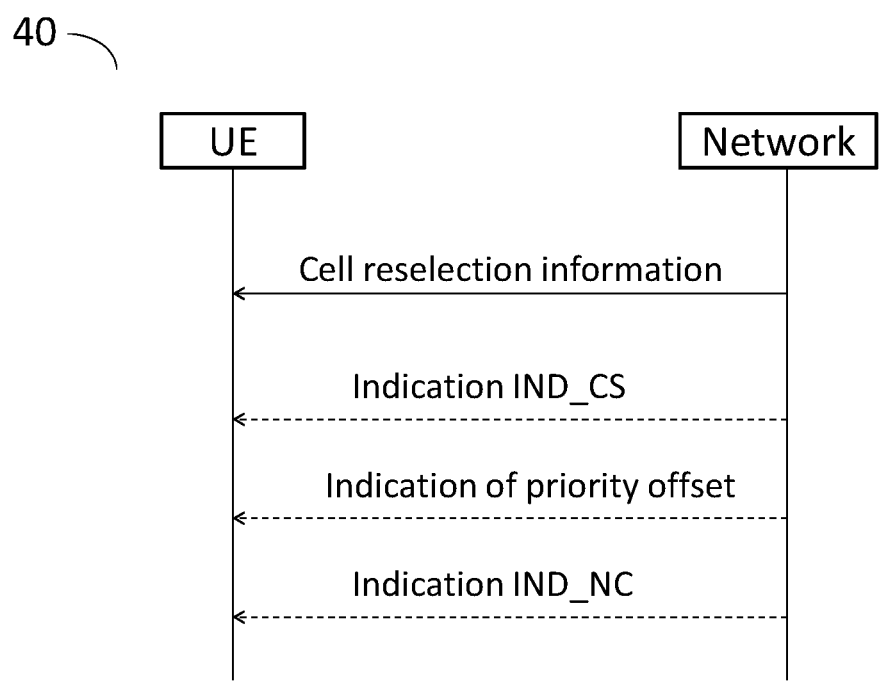
FIG. 4 shows a schematic diagram of a process according to an embodiment of the present disclosure.

FIG. 4 shows a schematic diagram of a process 40 according to an embodiment of the present disclosure. In the process 40, a network (e.g. a wireless network node) transmits cell reselection information to a UE camping in a serving cell of the network. Based on the cell reselection information, the UE prioritizes at least one cell CE_A of a network type NT_A for selecting a cell during (e.g. for) a cell selection/reselection procedure. Via transmitting the cell reselection information to the UE, the network is able to control the UE to preferentially select one of the at least one cell CE_A of the network type NT_A as the selected cell of the cell selection/reselection procedure. In other words, the UE prioritizes the network type NT_A rather than other network type for the cell selection/reselection procedure based on the cell reselection information.

In an embodiment, after selecting the cell for the cell selection/reselection procedure, the UE moves to the selected cell.

In an embodiment, the network controls the UE to move to a cell of the same network type of the network. That is, the network type NT_A is the network type of the network because the at least one cell CE_A is preferentially selected as the selected cell of the cell selection/reselection procedure. For example, when the network type of the network is non-terrestrial network (NTN), the network type NT_A is the NTN; and when the network type of the network is terrestrial network (TN), the network type NT_A is the TN.

In an embodiment, the network type NT_A is the NTN.

In an embodiment, the network type NT_A is the TN.

In an embodiment, the UE prioritizes the at least one cell CE_A of the network type NT_A by selecting one of the at least one cell CE_A of the network type NT_A as the selected cell of the cell selection/reselection procedure based on the cell reselection information. In other words, in response to the cell reselection information, the UE selects one of the at least one cell CE_A of the network type NT_A for the cell selection/reselection procedure and moves to the selected cell of the network type NT_A.

In an embodiment, the network may further transmit an indication IND_CS (as shown in FIG. 4) of selecting one of the at least one cell CE_A of the network type NT_A as the selected cell of the cell reselection procedure to the UE. Based on the indication IND_CS, the UE selects one of the at least one cell CE_A of the network type NT_A for the cell selection/reselection procedure and moves to the selected cell of the network type NT_A.

In an embodiment, the network determines that all of the UEs camping in the serving cell of the network should prioritize the network type NT_A during the cell selection/reselection procedure. In this embodiment, the network may broadcast the cell reselection information to all of the UEs camping in the serving cell of the network. For example, the cell reselection information may be configured in system information broadcasted by the network (e.g. master information block (MIB), system information block (SIB) 1, or a newly designed SIB containing information which is related to a neighbor cell relevant for the cell selection/reselection procedure. Note that, since the cell selection/reselection procedure comprises the intra-NTN cell selection/reselection procedure, the TN to NTN cell selection/reselection procedure and the NTN to TN cell selection/reselection procedure, the newly designed SIB may be designed for containing information which is related to the neighbor cells for all three cell selection/reselection procedures according to an embodiment of the present disclosure. In another embodiment, one newly designed SIB contains information which is related to the neighbor cell relevant for the intra-NTN cell selection/reselection procedure, another newly designed SIB contains information which is related to the neighbor cell relevant for the TN to NTN cell selection/reselection procedure, and still another newly designed SIB contains information which is related to the neighbor cell relevant for the NTN to TN cell selection/reselection procedure.

In an embodiment, the network determines that a portion of UEs camping in the serving cell of the network should prioritize the network type NT_A during the cell selection/reselection procedure and that at least one remaining UE does not have to prioritize the network type NT_A. Under such a condition, the cell reselection information is provided per UE. For example, the cell reselection information may be configured in a dedicated RRC signaling, such as an RRCRelease message or an RRCReject message, and the dedicated RRC signaling is transmitted to each of the UEs being determined to prioritize the network type NT_A.

In an embodiment, the cell reselection information comprises a cell list of at least one NTN cell (i.e. the cell of the NTN). The UE prioritizes the at least one cell CE_A of the network type NT_A during the cell selection/reselection procedure based on the cell list.

In an embodiment, the cell list comprises at least one physical layer cell identity (PCI) of the at least one NTN cell in the cell list.

In an embodiment, the network type NT_A is the NTN, the cell list of the cell reselection information is a white list. In this embodiment, the UE prioritizes the at least one cell CE_A of the network type NT_A by selecting one of the at least one NTN cell (e.g. the at least one cell CE_A) in the cell list as the selected cell of the cell selection/reselection procedure. For example, the UE may perform measurements on the at least one NTN cell in the cell list when receiving the cell list and perform the cell selection/reselection procedure to select one of the at least one NTN cell in the cell list. When an additional delay in the NTN is considered, the SS/PBCH (synchronization signal/physical broadcast channel) block measurement timing configuration (SMTC) in the existing TN may not be sufficient. Therefore, an SMTC window may be introduced in an embodiment of the present disclosure for an NTN cell or an SMTC offset, wherein the SMTC offset is used to adjust the SMTC used in the TN cell to get an applicable SMTC for the NTN cell. The NTN specific SMTC window or the SMTC offset can be configured per NTN cell or per satellite and can be provided from the network to the UE via system information or dedicated RRC signaling. Next, the UE adjusts the SMTC of the NTN cell based on the SMTC offset and an SMTC of a TN cell (e.g. extending a time window corresponding to the SMTC of the TN cell by the SMTC offset) and applies the adjusted SMTC when performing measurements of the NTN cell.

In an embodiment, the network type NT_A is the TN, the cell list becomes a black list. In this embodiment, the UE avoids selecting the cell from the at least one NTN cell (e.g. at least one cell CE_A) in the cell list for the cell selection/reselection procedure. That is, the selected cell of the cell selection/reselection procedure is avoided to be one of the at least one NTN cell in the cell list. For example, the UE may skip measurements on the at least one NTN cell in the cell list when receiving the cell list and perform cell reselection procedure to select a TN cell (i.e. a cell of the TN) which is not included in the cell list.

In an embodiment, the UE further receives an indication (not shown in FIG. 4) from the network, wherein the indication is configured to indicate selecting the cell for the cell reselection procedure based on the cell list in the cell reselection information. In an example, this indication is broadcasted in the system information (e.g. the MIB, the SIB1 or other SIB). In another example, this indication is transmitted in a dedicated RRC signaling.

In an embodiment, the NTN cells and the TN cells may be deployed in different frequencies. In this embodiment, at least one frequency FREQ_A of the at least one cell CE_A of the network type NT_A is prioritized for selecting the cell for the cell selection/reselection procedure.

In an embodiment, the at least one frequency FREQ_A of the at least one cell CE_A of the network type NT_A is prioritized by increasing a value of a frequency-level reselection priority associated with each of the at least one frequency FREQ_A. In this embodiment, the frequency-level priority is higher when its value is greater and the UE preferentially selects a frequency associated to the frequency-level priority with higher value during the cell selection/reselection procedure.

In an embodiment, the value of the frequency-level reselection priority associated to each of the at least one frequency FREQ_A is increased (e.g. configured or assigned) to a higher value within a value range of the frequency-level reselection priority. For example, in new radio (NR) network, the value range of the frequency-level reselection priority may be from 0 to 7. The value of the frequency-level reselection priority associated for each of the at least one frequency FREQ_A may be increased to 5, 6 or 7.

In an embodiment, the network type NT_A is the NTN and the value of the frequency-level reselection priority associated to each of frequencies of NTN cells (e.g. at least one frequency FREQ_A of the at least one cell CE_A) is increased to 5, 6 or 7 when the value range of the frequency-level reselection priority is from 0 to 7.

In an embodiment, the network type NT_A is the TN and the value of the frequency-level reselection priority associated to each of frequencies of TN cells (e.g. at least one frequency FREQ_A of the at least one cell CE_A) is increased to 5, 6 or 7 when the value range of the frequency-level reselection priority is from 0 to 7.

In an embodiment, there are more frequencies in the network deployment when the UE is served by both the NTN and the TN. Therefore, the value range of the frequency-level reselection priority is extended (e.g. enlarged) in this embodiment. For example, the value range of the frequency-level reselection priority may be extended from a range from 0 to 7 to another range from 0 to 15.

In an embodiment, the network type NT_A is the NTN and the value of the frequency-level reselection priority associated to each NTN cell (e.g. the at least one cell _CE_A) is increased to 13, 14 or 15 when the value range of the frequency-level reselection priority is extended to be from 0 to 15.

In an embodiment, the network type NT_A is the TN and the value of the frequency-level reselection priority associated to each TN cell (e.g. the at least one cell _CE_A) is increased to 13, 14 or 15 when the value range of the frequency-level reselection priority is extended to be from 0 to 15.

In an embodiment, the UE further receives a priority offset from the network as shown in FIG. 4. After receiving the priority offset, the UE adjusts the value of the frequency-level reselection priority associated with the at least one frequency FREQ_A by the priority offset.

In an embodiment, the network type NT_A is the NTN and the priority offset may be 8 when the value range of the frequency-level reselection priority is from 0 to 7. The UE adds 8 to the value of frequency-level reselection priority associated with each of the at least one frequency FREQ_A (i.e. associated with each of the NTN cell). As a result, the value of frequency-level reselection priority associated with each NTN cell becomes between 8 and 15 and is always greater than that associated with each TN cell. That is, each of the NTN cell has higher priority than each of TN cell for being selected during the cell selection/reselection procedure.

In an embodiment, the value of the frequency-level reselection priority associated with each of the at least one frequency FREQ_A is increased to be greater than a value of a frequency-level reselection priority associated with each of at least one frequency FREQ_B of at least one second cell CE_B of a network type NT_B, wherein the network type NT_B is different from the network type NT_A. For example, when the value range of the frequency-level reselection priority is from 0 to 15, the value of the frequency-level reselection priority associated with each of the at least one frequency FREQ_A may be configured between 8 and 15, to ensure that the value of the frequency-level reselection priority associated with each of the at least one frequency FREQ_A is always higher than that associated with each of the at least one frequency FREQ_B. In this embodiment, the network type NT_A may be the NTN and the network type NT_B may be the TN.

In an embodiment, the NTN cells and the TN cells may be deployed in the same frequency. In this embodiment, a cell-level reselection priority is introduced for selecting the cell for the cell selection/reselection procedure. The cell-level reselection priority of each cell of the network may be configured to the UE via the system information or the dedicated RRC signaling. The UE may prioritize the at least one cell CE_A by configuring the cell-level reselection priority associated with each of the at least one cell CE_A to be higher than that associated with each of at least one cell CE_C of a network type NT_C, wherein the network type NT_C is different from the network type NT_A. In this embodiment, the network type NT_A may be the NTN and the network type NT_C may be the TN. For example, the cell-level reselection priority of the at least one cell CE_A may be configured with a value VA_A and the cell-level reselection priority of the at least one cell CE_C may be configured with a value VA_B which is smaller than the value VA_A.

Note that, the methods of using the cell-level reselection priority to prioritize the at least one cell CE_A of the network type NT_A can be referred to those of using the frequency-level reselection priority to prioritize the at least one frequency FREQ_A, mutatis mutandis, and are not narrated herein for brevity.

In an embodiment, the network further transmits an indication IND_PC to the UE as shown in FIG. 4, to indicate whether a neighbor cell is one of the at least one cell CE_A of the network type NT_A (i.e. whether the network type of the neighbor cell is the prioritized network type NT_A). When receiving the indication IND_PC, the UE takes the network type of the neighbor cell into considerations when selecting the cell for the cell selection/resection procedure.

In an embodiment, the indication IND_PC is transmitted in the system information (e.g. MIB, SIB1 or other SIB) or in the dedicated RRC signaling.

In an embodiment, the network type NT_A is the NTN. When receiving the indication IND_PC (e.g. an indication "prioritizeNTN") indicating the network type of the neighbor cell is the network type NT_A (i.e. the NTN), the UE takes the network type of the neighbor cell into considerations and prioritizes the NTN cells (i.e. at least one cell CE_A) over the TN cells.

In an embodiment, the network type NT_A is the TN. When receiving the indication IND_PC (e.g. an indication "prioritizeTN") indicating the network type of the neighbor cell is the network type NT_A (i.e. the TN), the UE takes the network type of the neighbor cell into considerations and prioritizes the TN cells (i.e. at least one cell CE_A) over the NTN cells.

In and embodiment, the network type NT_A is the NTN and the network type NT_A (i.e. NTN) is prioritized by configuring the network of the network type NT_A as a non-public network. In this embodiment, the at least one cell CE_A of the network type NT_A is assigned with a specified closed access group (CAG) identifier and/or a network identifier (NID), to identify the non-public network formed by the at least one cell CE_A of the network type NT_A. For example, the CAG identifier is configured to identify a closed access group of the non-public network and the NID identifies a stand-alone non-public network (SNPN) in combination with a public mobile network (PLMN) ID. The at least one cell NT_A may broadcast the assigned closed access group identifier and/or the assigned network identifier in the system information. In addition, the UE is configured with an allowed CAG identifier list identifier and/or an allowed NID list. Note that, the allowed CAG identifier list identifier may only contain the specified CAG identifier assigned to the at least one cell CE_A of the network type NT_A and the allowed NID list may only comprise the NID assigned to the at least one cell CE_A of the network type NT_A.

When the UE supports only the non-public network, the UE selects only the cell with the CAG identifier in the configured allowed CAG identifier list and/or with the NID in the configured allowed NID list when performing the cell reselection procedure. Therefore, when being configured with the allowed CAG identifier list identifier and/or the allowed NID list, the UE supporting only the non-public network selects the cell for the cell reselection procedure from the at least one cell CE_A of the network type NT_A (i.e. NTN cells).

When the UE supports both the non-public network and the public network, the UE preferentially selects the cell with the CAG identifier in the configured allowed CAG identifier list and/or with the NID in the configured allowed NID list for the cell reselection procedure when the UE is configured with the allowed CAG identifier list identifier and/or the allowed NID list. As a result, the UE supports both the non-public network and public network prioritizes the at least one cell CE_A of the network type NT_A for the cell-reselection procedure.

In an embodiment of configuring the network of the network type NT_A as the non-public network, a satellite type (e.g. the GEO, the LEO, or the MEO) and/or a NTN type (e.g. a GEO network, a LEO network, or a MEO network) is configured per SNPN or per CAG or per PLMN. In addition, the satellite type and/or the NTN type of at least one SNPN, at least one CAG and/or at least one PLMN is provided to the UE via the system information or the dedicated RRC signaling.

Figure 5:
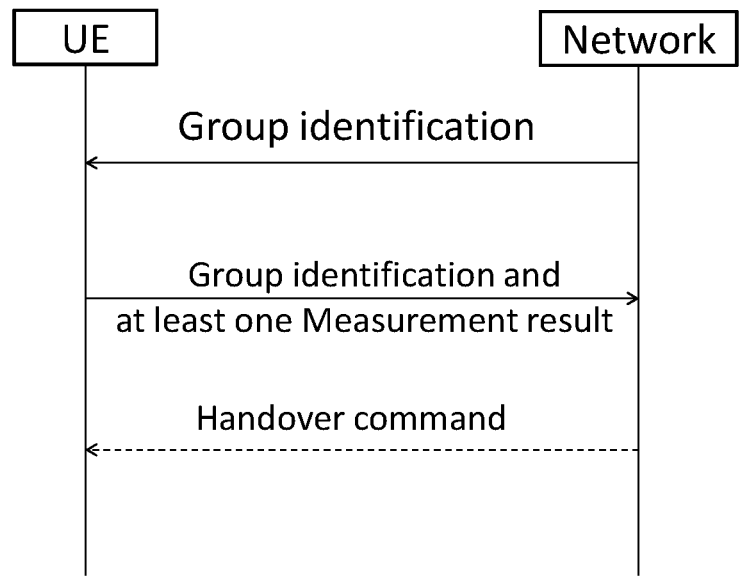
FIG. 5 shows a schematic diagram of a process according to an embodiment of the present disclosure.

FIG. 5 shows a schematic diagram of a process 50 according to an embodiment of the present disclosure. In the process 50, a network (e.g. a wireless network node) transmits a group identification (ID) to a UE, to identify a group of UE. The group ID may be assigned to the UE for a handover procedure. Next, the UE transmits the group ID together with at least one measurement result to the network for the handover procedure, e.g., when determining at least one handover condition (e.g. at least one measurement report condition) is satisfied. Based on the group ID and the at least one measurement result, the network determines to move all or a portion of UEs in the group associated to the group ID to other cells. When the network determines that the UE shown in FIG. 5 does not need to move to other cells, the network does not transmit a handover command to the UE shown in FIG. 5. When the network determines that the UE shown in FIG. 5 needs to move to another cell, the network performs handover preparations and transmits a handover command to the UE shown in FIG. 5. After receiving the handover command, the UE performs the handover procedure based on the handover command and moves to another cell.

In an embodiment, the group ID assigned by the network is determined based on at least one of a location or a service type of the UE. For example, the service type includes a voice communication service, a video streaming service, data communication service, etc. In other words, the network divides at least one UE camping in its service cell into at least one group based on the location and/or the service type of each of the at least one UE.

In an embodiment, the group ID is provided from the network to the UE via the system information or the dedicated RRC signaling (e.g. a RRCReconfiguration message).

In an embodiment, the group ID may be transmitted from the UE to the network via the dedicated RRC signaling (e.g. a measurement report).

In an embodiment, the network may move all or the portion of the at least one UE to the same cell.

In an embodiment, the network may move all or the portion of the at least one UE to the different cells.

Figure 6:
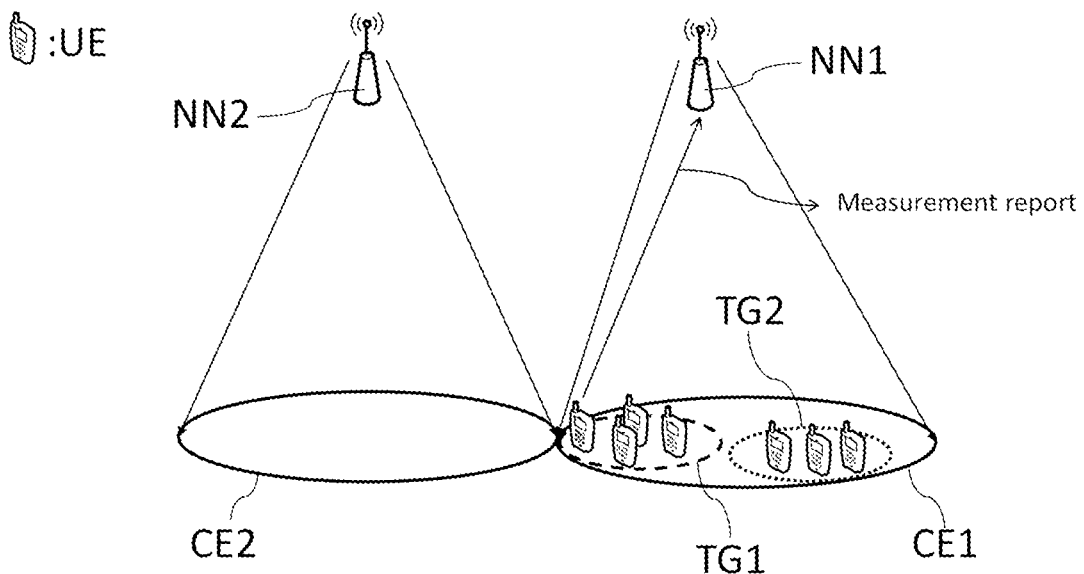
FIG. 6 shows a schematic diagram of a network according to an embodiment of the present disclosure.

FIG. 6 shows a schematic diagram of a network according to an embodiment of the present disclosure. In FIG. 6, a wireless network node NN1 (e.g. the network shown in FIG. 5) has a cell CE1 and there are 7 UEs in the cell CE1. Based on the locations and/or service types of the 7 UEs, the wireless network node divides the 7 UEs into 2 groups TG1 and TG2 and assigns group IDs (e.g. indexes 1 and 2) of the groups TG1 and TG2 to the 7 UEs. In FIG. 6, one of UEs in the group TG1 transmits a measurement report comprising the group ID of the group TG1 and at least one measurement result to the wireless network node NN1 when determining at least one measurement report condition is fulfilled, to inform the wireless network node NN1 that the UEs of the group TG1 can be moved (e.g. handover) to a cell CE2 of a wireless network node NN2. When receiving the measurement report including the group ID of the group TG1, the wireless network node NN1 determines to move all of the UEs in the group TG1 to the cell CE2 and performs handover preparations with the wireless network node NN2. Next, the wireless network node NN1 transmits handover commands to all of the UEs in the group TG1 and the all of the UEs in the group TG1 move to the CE2.

Figure 7:
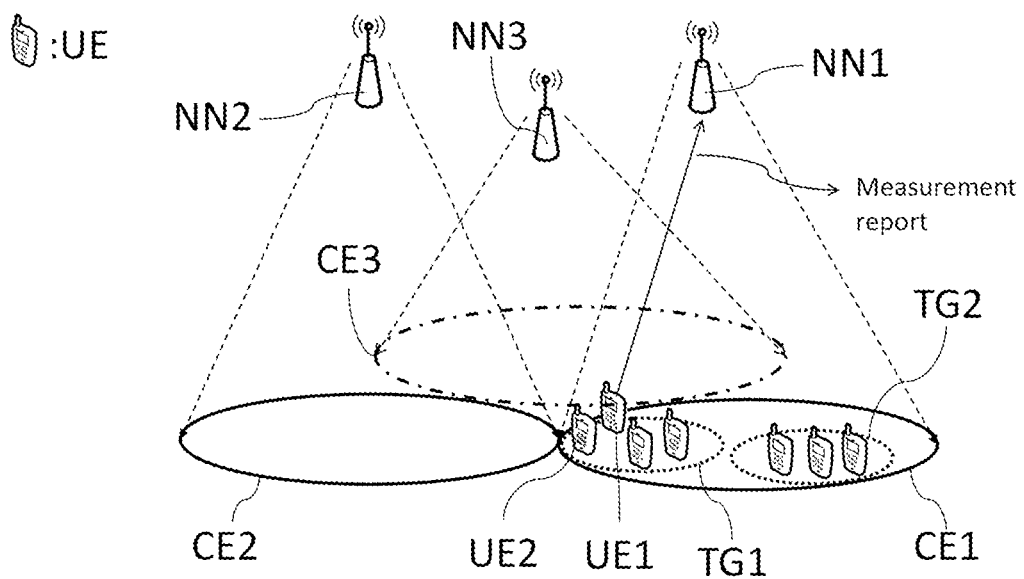
FIG. 7 shows a schematic diagram of a network according to an embodiment of the present disclosure.

FIG. 7 shows a schematic diagram of a network according to an embodiment of the present disclosure. In FIG. 7, a wireless network node NN1 (e.g. the network shown in FIG. 5) has a cell CE1 and there are also 7 UEs in the cell CE1. Based on the locations and/or service types of the 7 UEs, the wireless network node divides the 7 UEs into 2 groups TG1 and TG2 and assigns group IDs (e.g. indexes 1 and 2) of the groups TG1 and TG2 to the 7 UEs. In FIG. 7, a UE UE1 in the group TG1 transmits a measurement report comprising the group ID of the group TG1 and at least one measurement result to the wireless network node NN1 when determining at least one measurement report condition is fulfilled, to inform the wireless network node NN1 that the UEs of the group TG1 can be moved (e.g. handover) to a cell CE2 of a wireless network node NN2 or to a cell CE3 of a wireless network node NN3. When receiving the measurement report from the UE UE1, the wireless network node NN1 determines to handover UEs UE1 and UE2 (i.e. part of the UEs) in the group TG1 to other cells. Furthermore, the wireless network node NN1 determines to handover the UE UE1 to the cell CE3 and to handover the UE UE2 to the cell CE2. Next, the wireless network node NN1 performs handover preparations with the wireless network nodes NN2 and NN3, respectively, and transmits handover commands to the UEs UE1 and UE2, respectively. After receiving the handover commands, respectively, the UE UE2 moves to the cell C2 and the UE UE1 moves to the cell CE3. Note that, the other 2 UEs in the group TG1 remain camping in the cell CE1.

According to the aforementioned embodiments, the cell selection/reselection procedure and/or the handover procedure in the network comprising both the NTN and TN becomes more effective.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A skilled person would further appreciate that any of the various illustrative logical blocks, units, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software unit"), or any combination of these techniques.

To clearly illustrate this interchangeability of hardware, firmware and software, various illustrative components, blocks, units, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, unit, etc. can be configured to perform one or more of the functions described herein. The term "configured to" or "configured for" as used herein with respect to a specified operation or function refers to a processor, device, component, circuit, structure, machine, unit, etc. that is physically constructed, programmed and/or arranged to perform the specified operation or function.

Furthermore, a skilled person would understand that various illustrative logical blocks, units, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, units, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein. If implemented in software, the functions can be stored as one or more instructions or code on a computer-readable medium. Thus, the steps of a method or algorithm disclosed herein can be implemented as software stored on a computer-readable medium.

Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "unit" as used herein, refers to software, firmware, hardware, and any combination of these elements for performing the associated functions described herein. Additionally, for purpose of discussion, the various units are described as discrete units; however, as would be apparent to one of ordinary skill in the art, two or more units may be combined to form a single unit that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A wireless communication method for use in a wireless terminal, comprising:
   receiving, from a wireless network node, cell reselection information; and
   prioritizing at least one first cell of a first network type for selecting a cell for a cell reselection procedure based on the cell reselection information,
   wherein at least one first frequency of the at least one first cell of the first network type is prioritized for selecting the cell for the cell reselection procedure,
   wherein the at least one first frequency of the at least one first cell of the first network type is prioritized by increasing a value of a frequency-level reselection priority associated with each of the at least one first frequency, and
   wherein a range of the value of the frequency-level reselection priority is extended,
   wherein the method further comprising:
   receiving, from the wireless network node, a priority offset, and
   adjusting the value of the frequency-level reselection priority associated with each of the at least one first frequency by the priority offset, and
   wherein the value of the frequency-level reselection priority associated with each of the at least one first frequency is increased to be greater than a value of a frequency-level reselection priority associated with each of at least one second frequency of at least one second cell of a second network type, and the second network type is different from the first network type.

2. The wireless communication method of claim 1, wherein the first network type is a network type of the wireless network node.

3. The wireless communication method of claim 1, wherein the first network type is one of a non-terrestrial network (NTN) or a terrestrial network (TN).

4. The wireless communication method of claim 1, further comprising:
receiving, from the wireless network node, an indication of selecting one of the at least one first cell of the first network type as the selected cell of the cell reselection procedure.

5. The wireless communication method of claim 1, wherein the cell reselection information comprises a cell list of at least one NTN cell.

6. The wireless communication method of claim 5, wherein the first network type is NTN and the selected cell is one of the at least one NTN cell in the cell list or the first network type is TN and the selected cell is avoided to be one of the at least one NTN cell in the cell list.

7. The wireless communication method of claim 1, wherein the at least one first cell of the first network type is prioritized by:
configuring a cell-level reselection priority associated with each of the at least one first cell of the first network type with a first value greater than a second value of a cell-level reselection priority associated with each of at least one third cell of a third network type, and
wherein the third network type is different from the first network type.

8. The wireless communication method of claim 1, further comprising:
receiving, from the wireless network node, an indication of whether a neighbor cell is one of the at least one first cell of the first network type.

9. A wireless terminal, comprising:
at least one processor; and
a memory, which is configured to store at least one program;
wherein the at least one program, when executed by the at least one processor, enables the at least one processor to perform the method of claim 1.

10. A wireless communication method for use in a wireless network node, comprising:
transmitting, to a wireless terminal, cell reselection information of prioritizing at least one first cell of a first network type for selecting a cell for a cell reselection procedure,
wherein at least one first frequency of the at least one first cell of the first network type is prioritized for selecting the cell for the cell reselection procedure, and
wherein the at least one first frequency of the at least one first cell of the first network type is prioritized by increasing a value of a frequency-level reselection priority for each of the at least one first frequency, and
wherein a range of the value of the frequency-level reselection priority is extended,
wherein the method further comprising:
transmitting, to the wireless terminal, a priority offset for adjusting the value of the frequency-level reselection priority for each of the at least one first frequency, and
wherein the value of the frequency-level reselection priority for each of the at least one first frequency is increased to be greater than a value of a frequency-level reselection priority for each of at least one second frequency of at least one second cell of a second network type, and the second network type is different from the first network type.

11. The wireless communication method of claim 10, wherein the first network type is a network type of the wireless network node.

12. The wireless communication method of claim 10, wherein the first network type is one of a non-terrestrial network (NTN) or a terrestrial network, TN.

13. The wireless communication method of claim 10, further comprising:
transmitting, to the wireless terminal, an indication of selecting one of the at least one first cell of the first network type as the selected cell of the cell reselection procedure.

14. The wireless communication method of claim 10, wherein the cell reselection information comprises a cell list of at least one NTN cell.

15. The wireless communication method of claim 14, wherein the first network type is NTN and the selected cell is one of the at least one NTN cell in the cell list or the first network type is TN and the selected cell is avoided to be one of the at least one NTN cell in the cell list.

16. The wireless communication method of claim 10, wherein the at least one first cell of the first network type is prioritized by:
configuring a cell-level reselection priority associated with each of the at least one first cell of the first network type with a first value greater than a second value of a cell-level reselection priority associated with each of at least one third cell of a third network type, and
wherein the third network type is different from the first network type.

17. The wireless communication method of claim 10, further comprising:
transmitting, to the wireless terminal, an indication of whether a neighbor cell is one of the at least one first cell of the first network type.

18. A wireless network node, comprising:
at least one processor; and
a memory, which is configured to store at least one program;
wherein the at least one program, when executed by the at least one processor, enables the at least one processor to perform the method of claim 10.

* * * * *